July 4, 1933. G. BLATCHFORD 1,916,781
SEEDER
Filed Sept. 9, 1931 2 Sheets-Sheet 2
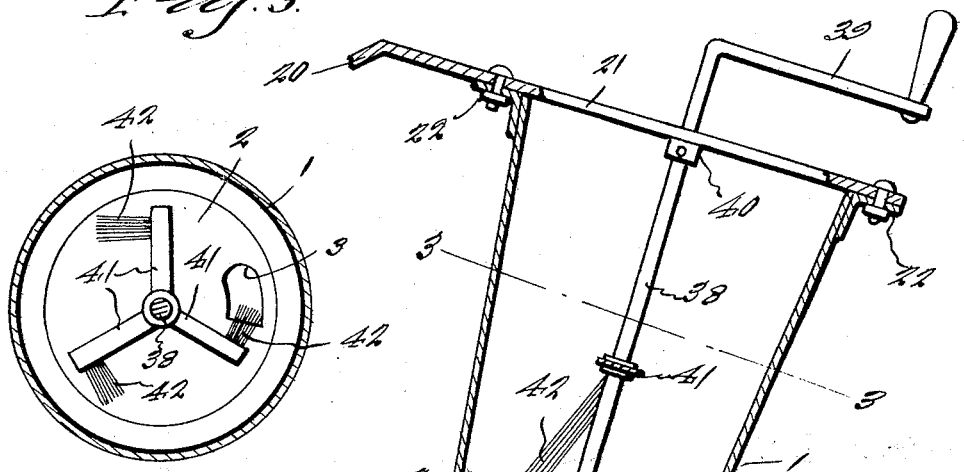
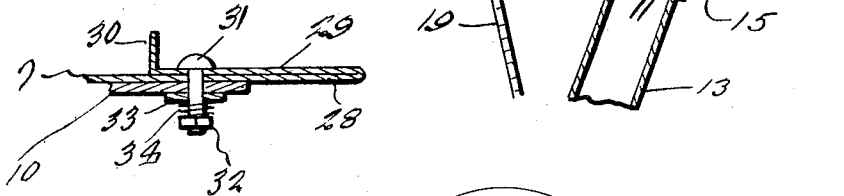
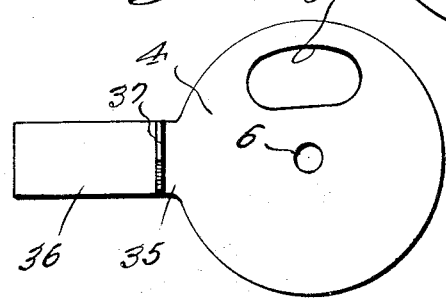
Inventor
George Blatchford
By Clarence A. O'Brien
Attorney Patented July 4, 1933

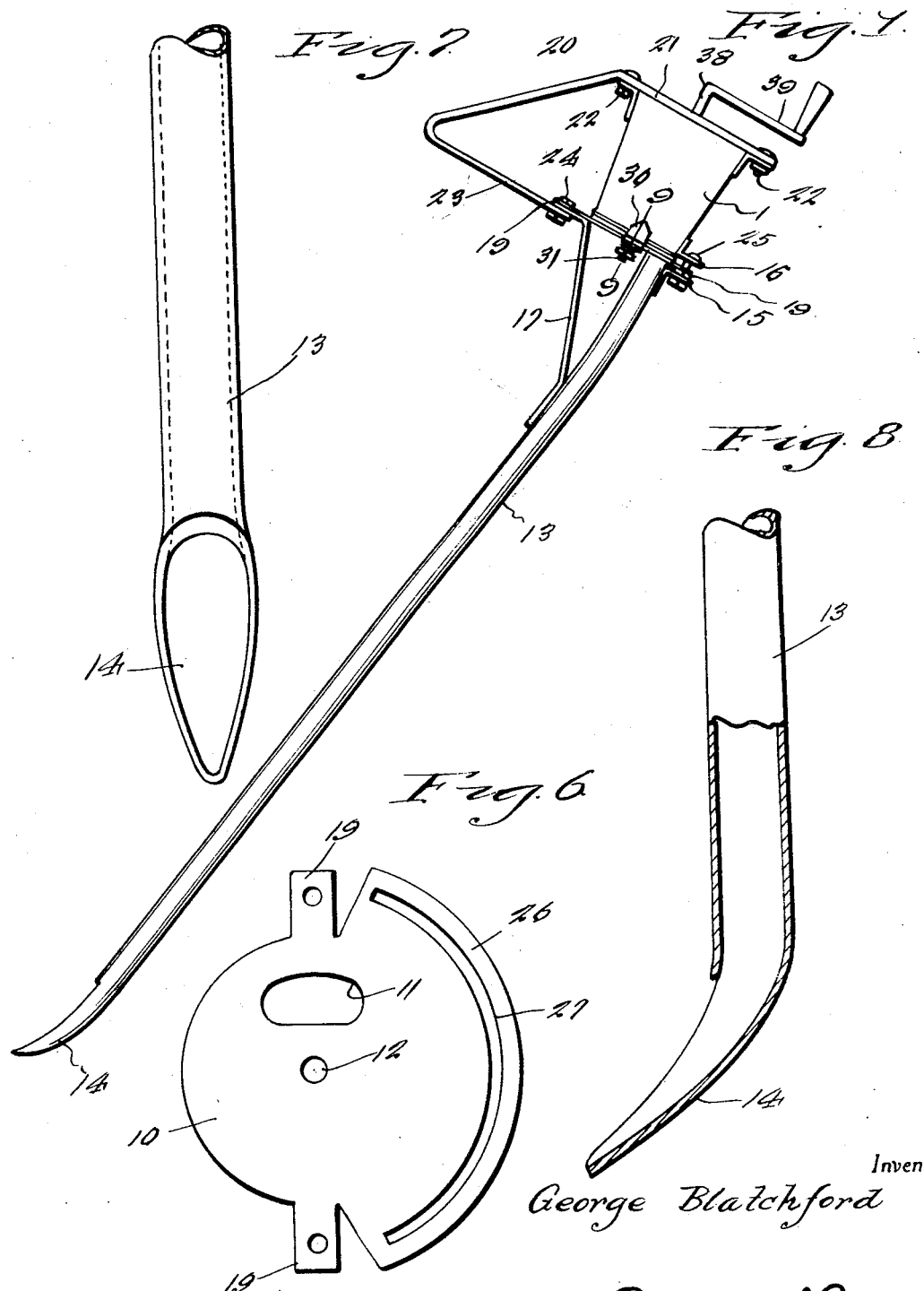

1,916,781

UNITED STATES PATENT OFFICE

GEORGE BLATCHFORD, OF FRIEND, NEBRASKA

SEEDER

Application filed September 9, 1931. Serial No. 561,974.

The present invention relates generally to agricultural implements and more particularly to seeders of the hand type and has for one of its important objects to provide, in a manner as hereinafter set forth, a seeder of this character embodying novel means for discharging the seeds and for controlling or regulating the discharge of said seeds as desired.

Other objects of the invention are to provide a seeder of the aforementioned character which will be simple in construction, strong, durable, efficient and reliable in use, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a seeder in accordance with this invention.

Figure 2 is a view in vertical section through the upper portion of the seeder with a portion of the handle broken away.

Figure 3 is a cross sectional view taken substantially on the line 3—3 of Figure 2.

Figure 4 is a detail view in plan of the feed regulating plate.

Figure 5 is a detail view in plan of the feed cut-off plate.

Figure 6 is a detail view in plan of the lowermost plate.

Figure 7 is a view in rear elevation showing the lower end portion of the spout.

Figure 8 is a view principally in vertical section of the lower end portion of the spout.

Figure 9 is a detail view in section taken substantially on the line 9—9 of Figure 1.

Referring now to the drawings in detail, it will be seen that the seeder constituting the present invention comprises a hopper 1 for the reception of the seeds, said hopper having its bottom 2 provided with an arcuate, substantially semi-oval outlet opening 3. The hopper 1 is open at its top. Disposed co-axially beneath the bottom 2 of the hopper 1 is a circular cut-off plate 4 having an arcuate, substantially oval opening 5 therein to be brought into registry with the opening 3 in the bottom 2. The cut-off plate 4 is further provided with a centrally disposed circular opening 6 which registers with a similar opening provided centrally in the bottom 2.

Disposed co-axially beneath the cut-off plate 4 is a feed regulating plate 7 having an opening 8 therein which is adapted to communicate with the interior of the hopper 1 through the openings 5 and 3. This opening 8 has an enlarged part gradually decreasing in width to the end opposite the end having the enlarged part, as clearly shown in Fig. 4, so that by adjusting this plate 7, to place different parts of the opening 8 under the opening in the cut-off plate, the amount of seed passing from the hopper can be regulated. The regulating plate 7 is further provided with a centrally disposed circular opening 9 which registers with the opening 6 in the cut-off plate 4. Disposed co-axially beneath the regulating plate 7 is a supporting plate 10 having an arcuate, substantially oval opening 11 therein which is adapted for communication with the interior of the hopper 1 through the openings 3, 5 and 8. The supporting plate 10 is further provided with a centrally disposed circular opening 12 which is in registry with the opening 9 of the regulating plate 7.

The reference numeral 13 designates a seed spout having its upper end disposed in abutting engagement with the lower side of the supporting plate 10 and communicating with the opening 11 therein. At its lower end the spout 13 terminates in a rearwardly curved lip 14 which is adapted to trail in a trench or furrow in a manner to permit the seed to be viewed by the operator as it leaves the spout. The lip 14 also facilitates the dragging of the spout in the trench or furrow by readily riding over obstructions which may be encountered.

A bracket 15 is secured in any suitable manner to the upper end portion of the spout 13 and is disposed beneath a bracket 16 which is secured in any suitable manner to a lower portion of the hopper 1. The brace 17 has its lower end secured in any suitable manner to an upper portion of the spout 13 in spaced relation below the upper end of said spout and said brace terminates, at its upper end, in an apertured angular end portion 18. On diametrically opposite sides the supporting plate 10 has formed integrally thereon the apertured arms 19 which rest on the bracket 15 and on the end portion 18 of the brace 17. The reference numeral 20 designates a handle which is disposed diagonally with respect to the hopper 1 and which includes an integral extension 21 disposed across the top of the hopper and secured thereto by suitable means, such as brackets and bolts 22. Extending at an acute angle from the outer end of the handle 20 toward the lower end of the hopper 1 is an arm 23 which projects beneath the extension 18 of the brace 17. A bolt 24 passes through the free end portion of the arm 23, the extension 18 of the brace 17 and the overlying arm 19 of the supporting plate 10 and has threaded thereon a nut for clamping these elements together. The bolt 25 passes through the brackets 15 and 16 and the adjacent arm 19 of the supporting plate 10 and has threaded thereon a nut for clamping these elements together.

A segment 26 is formed integrally with the supporting plate 10 and is provided with an arcuate slot 27. An operating handle 28 is formed integrally with the regulating plate 7 and is adapted to travel over the segment 26, said handle being turned inwardly upon itself, as at 29, and terminating in an upturned pointed end portion 30 constituting an indicator. The indicator 30 is adapted to travel closely adjacent the lower portion of the hopper 1 and said lower hopper may be graduated to facilitate setting the regulator plate 7 in any desired position. A bolt 31 extends through the handle 28 from the upper side thereof and through the slot 27 of the segment 26 and has threaded thereon a nut 32. The washer 33 is mounted on the bolt 31 and is frictionally engaged with the lower side of the segment 26 by a coil spring 34 which also is mounted on the bolt 31.

Formed integrally with the cut-off plate 4 is an arm 35 which is turned back upon itself, as at 36, and terminates in an upturned pointed end portion constituting an indicator 37 which also may cooperate with graduations placed on the hopper 1 to indicate if the cut-off plate is in its open or closed position. The arm 35 extends outwardly from the opposite side of the hopper 1 to that from which the arm 28 extends.

The reference numeral 38 designates a shaft which is disposed centrally in the hopper 1 and which has its lower end portion journaled in the central openings in the bottom 2 and the plates 4, 7, and 10. The upper portion of the shaft 38 extends rotatably through the extension 21 of the handle 20 and terminates in an actuating crank 39. Collars 40 are fixed on the shaft 38 for engagement with the extension 21 and the bottom 2 of the hopper 1 for retaining said shaft against longitudinal movement. Arms 41 radiate from an intermediate portion of the shaft 38 and have mounted thereon the wire bristles 42 which are engaged with the bottom 2 of the hopper 1. The bristles are dragged over the bottom of the hopper at an inclination or slant relative thereto for discharging the seed in a highly efficient manner.

In use, the cut-off plate 4 is moved to its closed position and the seeds are placed in the hopper 1. The regulating plate 7 is then adjusted to the desired position and the spout 13 is dragged through the trench or furrow which has been formed. By actuating the shaft 38 proper feeding of the seeds to the spout 13 is assured and clogging of the seed in the hopper or in the outlet openings is prevented.

It is believed that the many advantages of a seeder constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A seeder comprising a hopper for the reception of seeds, said hopper including a bottom having a seed outlet opening therein, a cut-off plate disposed rotatably beneath the bottom of the hopper and having an opening therein for registry with the opening in the hopper bottom, a regulating plate mounted rotatably beneath the cut-off plate and having a substantially ovate opening therein for communication with the first and second named openings, handles projecting from the cut-off plate and the regulating plate for manually actuating the same, a stationary supporting plate disposed beneath the regulating plate and having an opening therein in communication with the first named openings, a discharge spout depending from the supporting plate and communicating with the opening therein, ears projecting from the periphery of the supporting plate, a bracket attached to the hopper, a bolt passing through the bracket and one of the ears, and a handle having a part connected to the hopper and another part connected with the other ear of the supporting plate.

2. A seeder comprising a hopper having an opening in its bottom, a cut-off plate contacting the bottom of the hopper and having an opening therein, a regulating plate contacting the cut-off plate and having an opening therein of elongated form, and gradually decreasing in width from one end to the other end, handles projecting from the cut-off plate and the regulating plate, a supporting plate contacting the regulating plate and having an opening therein, a spout depending from the supporting plate and registering with the opening therein, ears projecting from the periphery of the supporting plate, a bracket on the hopper, a bolt passing through the bracket and thru one of the ears, a handle having a part connected with the hopper and another part with the other ear.

3. A seeder comprising a hopper having an opening in its bottom, a cut-off plate contacting the bottom of the hopper and having an opening therein, a regulating plate contacting the cut-off plate and having an opening therein of elongated form, and gradually decreasing in width from one end to the other end, handles projecting from the cut-off plate and the regulating plate, a supporting plate contacting the regulating plate and having an opening therein, a spout depending from the supporting plate and registering with the opening therein, ears projecting from the periphery of the supporting plate, a bracket on the hopper, a bolt passing through the bracket and through one of the ears, a handle having a part connected with the hopper and another part with the other ear, a brace connected with the spout and its other end with said other ear.

4. A seeder comprising a hopper having an opening in its bottom, a cut-off plate contacting the bottom of the hopper and having an opening therein, a regulating plate contacting the cut-off plate and having an opening therein of elongated form, and gradually decreasing in width from one end to the other end, handles projecting from the cut-off plate and the regulating plate, a supporting plate contacting the regulating plate and having an opening therein, a spout depending from the supporting plate and registering with the opening therein, ears projecting from the periphery of the supporting plate, a bracket on the hopper, a bolt passing through the bracket and through one of the ears, a handle having a part connected with the hopper and another part with the other ear, a brace connected with the spout and its other end with said other ear, a shaft passing through the hopper and having its lower end passing through the bottom of the hopper and the three plates and brush means carried by the shaft and contacting the bottom of the hopper.

In testimony whereof I affix my signature.

GEORGE BLATCHFORD.